US010387053B1

(12) United States Patent
Olgiati (10) Patent No.: US 10,387,053 B1
(45) Date of Patent: Aug. 20, 2019

(54) MEMORY SYNCHRONIZATION IN A DISTRIBUTED COMPUTING SYSTEM

(71) Applicant: Amazon Technologies, Inc., Seattle, WA (US)

(72) Inventor: Andrea Olgiati, Gilroy, CA (US)

(73) Assignee: Amazon Technologies, Inc., Seattle, WA (US)

( * ) Notice: Subject to any disclaimer, the term of this patent is extended or adjusted under 35 U.S.C. 154(b) by 274 days.

(21) Appl. No.: 14/856,158

(22) Filed: Sep. 16, 2015

(51) Int. Cl.
*G06F 3/06* (2006.01)

(52) U.S. Cl.
CPC ............ *G06F 3/0619* (2013.01); *G06F 3/065* (2013.01); *G06F 3/067* (2013.01); *G06F 3/0665* (2013.01); *G06F 3/0689* (2013.01)

(58) Field of Classification Search
CPC ...... G06F 3/0619; G06F 3/065; G06F 3/0665; G06F 3/067; G06F 3/0689
See application file for complete search history.

(56) References Cited

U.S. PATENT DOCUMENTS

| | | | | |
|---|---|---|---|---|
| 6,065,077 A * | 5/2000 | Fu | ....................... | G06F 12/0813 710/100 |
| 6,374,331 B1 * | 4/2002 | Janakiraman | ....... | G06F 12/0817 711/141 |
| 6,487,643 B1 * | 11/2002 | Khare | ................. | G06F 12/0815 711/148 |
| 8,572,022 B2 * | 10/2013 | Hagan | ............... | G06F 17/30581 707/608 |
| 2006/0136670 A1 * | 6/2006 | Brown | ................... | G09G 5/363 711/118 |
| 2009/0171962 A1 * | 7/2009 | Goodman | ............... | G06F 9/467 |

OTHER PUBLICATIONS

Fich et al (Relations between concurrent-write models of parallel Computation, Society for Industrial and Applied Mathematics vol. 17, No. 3, Jun. 1998 (Year: 1998).*
Wikipedia, "Remote direct memory access," retrieved on Jan. 16, 2019, from https://en.wikipedia.org/wiki/Remote_direct_memory_access, 2 pages.

\* cited by examiner

*Primary Examiner* — Adam M Queler
*Assistant Examiner* — Edmund H Kwong
(74) *Attorney, Agent, or Firm* — Davis Wright Tremaine LLP (57) ABSTRACT

Regions of memory in a distributed computing system may be synchronized. A first computing node may comprise a processor writing to a memory via a memory controller. A request to write data to the memory may be received by the memory controller. The memory controller may send a signal to a logic device which forwards the signal to other computing nodes in the distributed system. The memory controller may detect and respond to conflicting writes by instructing the computing nodes to overwrite conflicting memory regions with a data pattern indicative of the conflict.

20 Claims, 10 Drawing Sheets

MEMORY SYNCHRONIZATION IN A DISTRIBUTED COMPUTING SYSTEM

BACKGROUND

Distributed computing systems may sometimes synchronize the contents of memory between the computing nodes that make up the system. Some approaches to memory synchronization involve the use of a central processing unit ("CPU") and network links to transfer data between nodes and to detect and rectify conflicts that may occur during the synchronization process. These approaches may, in some cases, over-utilize the CPU. Other approaches to memory synchronization, such as remote direct memory access ("RDMA") may lessen the burden on the CPU by enabling direct transfers between memories without the involvement of the CPU. However, these approaches may still rely primarily on the CPU to detect and manage potential conflicts.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Disclosed herein are system, methods, and computer program products relating to memory synchronization in a distributed computing system. A distributed computing system may involve a number of computing nodes which participate in processing a workload. For example, a distributed database system may involve a number of computing nodes, each of which manages a subset, or partition, of the data managed by the system.

There are various cases in which the computing nodes in a distributed system may synchronize memory regions between the various nodes. For example, in some instances a distributed database management system may maintain a table or log file in the memory of one of its computing nodes. The system may replicate the data in the memory with other computing nodes in the system, so that the other nodes are ready if a failover condition occurs. In another example, the computing nodes in a distributed system might utilize a global counter which is incremented each time it is used. These examples are intended to be illustrative of scenarios in which memory synchronization in a distributed computing system is utilized, and should not be viewed as limiting the scope of the present disclosure to the particular scenarios just described.

The system, methods, and computer program products described herein may comprise or work in conjunction with a distributed computing system comprising a plurality of links to a logic device such as a field programmable gate array ("FPGA"). The links may include lower-level networking components selected for low latency and high reliability. For example, with reference to the open systems interconnection ("OSI") model, the link may operate on the physical and/or data link layer. The links may be designed based on an assumption that transmission over the links is secure and that signals sent over the links are not dropped. Consequently, no retransmission mechanism is necessary.

The logic device may be a configurable logic device such as an FPGA or a customized device such as an application-specific integrated circuit ("ASIC"). The logic device may, for example, comprise an array of programmable logic gates and other similar facilities. The logic device may, in some cases, be pre-wired to perform the various functions described herein. An FPGA, ASIC, or other similar logic devices may be used in place of general purpose computers having an operating system and other facilities due to increased processing latency and decreased reliability that may be associated with a general purpose computer. The logic device may also possess greater consistency regarding processing latency, and may be selected for use in various embodiments described herein based on its consistency regarding the amount of time needed to process signals from the computing nodes in the distributed system.

A computing node of the distributed system may contain a memory controller configured to receive and process requests to store data at a memory location within the computing node. A range of memory addresses may be reserved for synchronization. The memory controller may bifurcate requests to write data within the range of memory addresses, so that the write is processed both locally and on remote computing nodes. When processing a request to store data locally, the memory controller may determine that a region of memory that is to be written to falls within a range of memory that is to be synchronized, and as a result send a signal to the logic device in addition to directly processing the write operation.

The logic device may send signals indicative of a write operation performed on one computing node to other computing nodes in the distributed computing system. Upon receipt of such a signal, the memory controller of a computing node may apply the change to a corresponding region of memory. In this manner, the memory regions of the computing nodes are kept synchronized. Typically, the links are such that the latency is kept below a threshold amount. There is, however, a possibility of conflicting writes made by computing nodes in the distributed system. The logic device may detect conflicts by maintaining, for a period of time based on link latency, a record of recent write activity including the locations written to. When two computing nodes attempt to write to the same location within a threshold amount of time, the logic device may send signals to the computing nodes in the cluster indicating that a conflict has occurred within the affected memory region. Upon receiving the signal, the computing nodes in the distributed computing system may, by their respective memory controllers, overwrite the affected region of memory with information indicative of the conflict.

A program executing on a computing node may, by its CPU, confirm that a write has been successfully synchronized by confirming that a memory region that was the target of a write operation contains the expected value after at least a threshold amount of time has elapsed. If a conflict has occurred, the memory region will instead contain data that indicates that a conflict has occurred. The data might be contained within a defined header region of the memory region that was written to. A bit in the header region may, for example, be set to "on" to indicate that a conflict has occurred. A conflict may be presumed to not have occurred if the bit has not been set. If a conflict is indicated, the program may perform whatever conflict resolution steps are appropriate for its purposes. Conversely, the CPU may determine that no conflict exists by accessing the memory region and determining that it does not contain information indicative of a conflict. As such, the memory region contains information indicative of an absence of conflict. The CPU may access the memory region to make this determination after a threshold amount of time has elapsed. The amount of time may be based on the latency characteristics of the links and the logic device being employed.

A conflict may include write operations performed by two or more computing nodes on the same memory region within some threshold amount of time. The term "conflict" may not necessarily involving incompatibility between the operations. For example, in some cases, the operations might write the same values to the memory region and, depending upon various factors such as the particular application, this may not represent a conflict, even if it is treated as such by the system.

Figure 1:
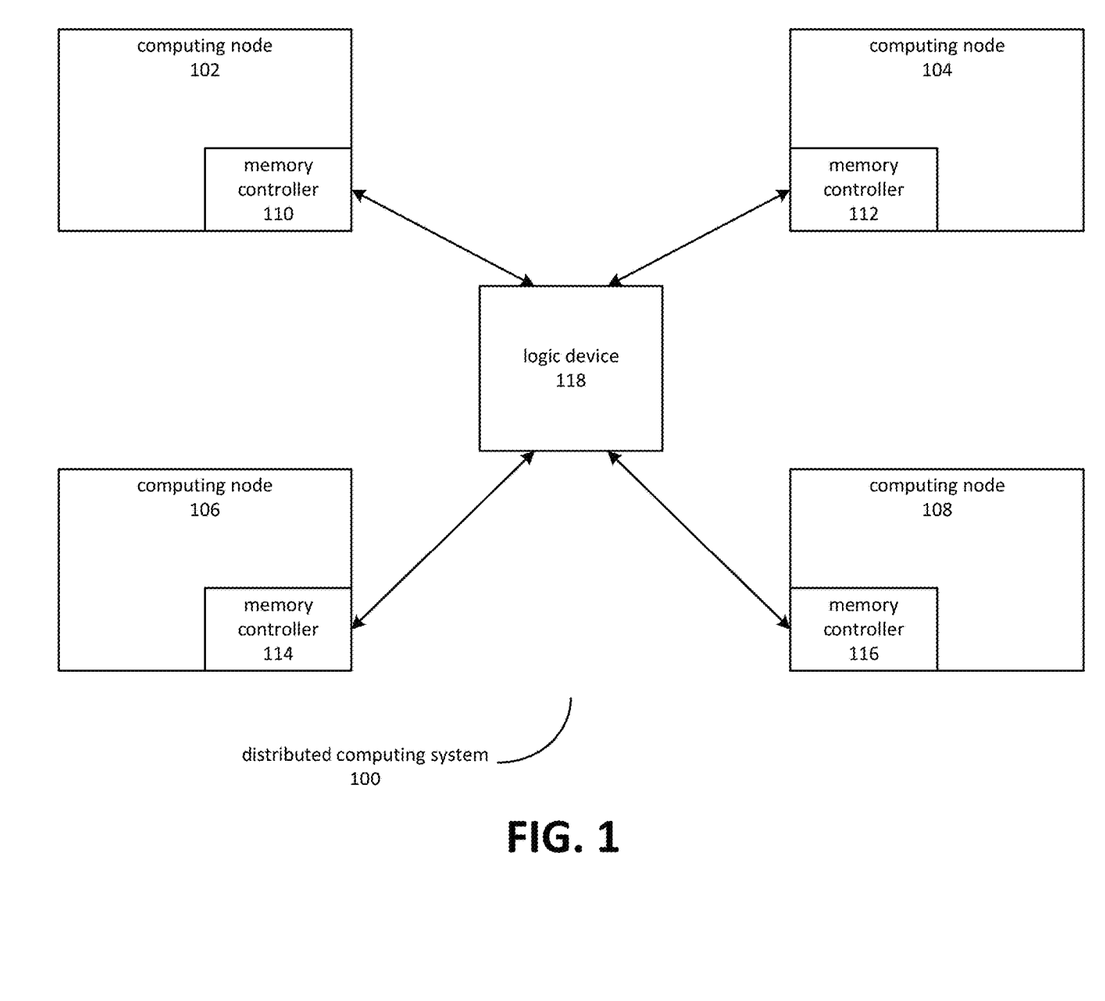
FIG. 1 is a block diagram depicting an example of a distributed computing system with synchronized memory access.

FIG. 1 is a block diagram depicting an example of a distributed computing system 100 with synchronized memory access. The distributed computing system 100 may comprise a number of computing nodes 102-108. For various reasons, the computing nodes 102-108 may wish to synchronize the contents of a memory region, so that each computing node 102-108 has a memory region whose contents are equivalent to correspond regions on the other computing nodes 102-108. For example, computing node 102 might designate a region of memory to be synchronized with the other computing nodes 104-108 in the distributed computing system 100. When values at locations within the memory region are changed on the first computing node 102, the corresponding memory locations on the other computing nodes 104-108 may be changed to be the same values. Similarly, if a value is written to a location on a second computing node 104, the corresponding locations on the other computing nodes 102 and 106-108 may also be changed.

The distributed computing system 100 may perform the synchronization using a logic device 118 or other logic device that is communicatively coupled to the computing nodes 102-108 in the distributed computing system 100. A star configuration, such as the one depicted in FIG. 1, may be employed. The logic device 118 may be at the hub of the star configuration, with one of the computing nodes 102-108 at the end of each spoke.

Each of the computing nodes 102-108 may have a corresponding memory controller 110-116 that interfaces with the logic device 118. For example, a first computing node 102 might have a memory controller 110 that interfaces with a processor of the computing node 102. The memory controller 110 may receive requests from the processor to store data in a location of the memory of the computing node 102. When the memory controller receives this indication, it may send a signal describing the change to the memory location to the logic device 118.

The logic device 118 may than send corresponding signals to each of the other computing nodes 104-108, where the respective memory controllers 112-116 may process the signal and apply the change to a corresponding memory location in the memories of the computing nodes 104-108.

The links between the computing nodes 102-108 and the logic device 118 may be presumed to be reliable. It may also be presumed that there is no likelihood of lost packets, so that packet retransmission and associated techniques for ensuring reliable transmissions are not required. The latency of signal transmission over the links may also be below some known threshold amount. Nevertheless, even under these conditions the latency of a signal transmission, and the latency of processing the signal, may allow for conflicting changes to occur. For example, computing node 102 might set the value of the memory address $M_1$ to 0xAB. The memory controller 110 might send a signal indicative of the change to memory address $M_1$ to the logic device, which in turn may send corresponding signals to the other computing nodes 104-108. While this is occurring, computing node 106 might also make to change to the same memory address within its own memory, for example to the value 0x12.

The logic device 118 may resolve the conflict by sending to each of the computing nodes 102-108 a message indicative of the conflict. The respective memory controllers 110-116 may then overwrite the contents of the location $M_1$ with a value that is indicative of the conflict. For example, the memory location $M_1$ on each of computing nodes 102-108 might be overwritten with the value 0xFF.

The processors of the computing nodes 102-108 might, subsequent to attempting to write a value to a shared memory location, monitor the location or recheck the memory location after a threshold amount of time. The threshold might be based at least in part on the maximum expected transmission latency of the signals. As an example, a thread of execution running on a processor of computing node 102 may attempt write the value 0xAB to memory location $M_1$. After initiating the write, the thread might enter a sleep state or spin lock for a brief period of time, such as twice the latency of the link between computing node 102 and the logic device 118, plus additional time to reflect other latency factors such as the processing time of the logic device 118 and the memory controller 110. After the time period has elapsed, the thread of execution might proceed to check whether or not the value expected, e.g., 0xAB, is contained in the location $M_1$. If it is, the write may be presumed to have succeeded. If not, e.g. 0xFF is contained in the location $M_1$, a conflict may be presumed to have occurred. In some instances, the thread of execution might then proceed to take steps to resolve the conflict.

Figure 2:
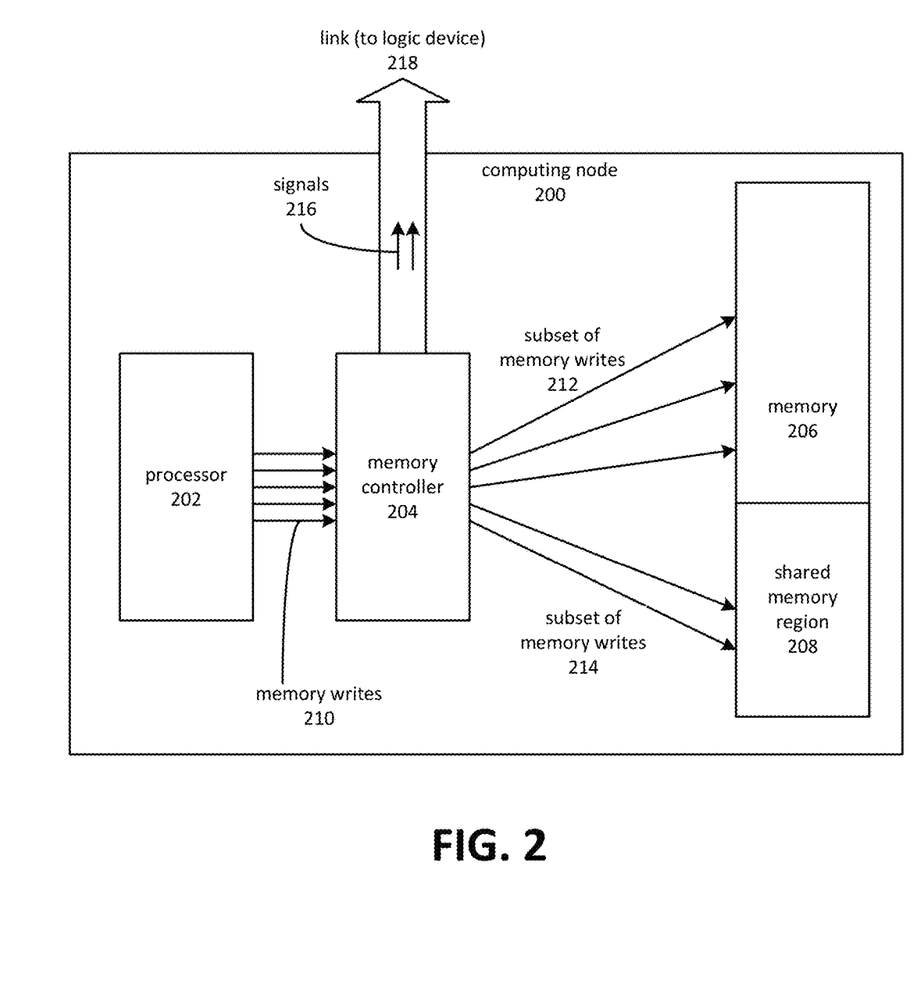
FIG. 2 is a block diagram depicting a computing node with a memory controller configured to synchronize a shared memory region.

The operation of the processor and memory controller may be better understood in view of FIG. 2, which is a block diagram depicting a computing node with a memory controller configured to synchronize a shared memory region. A computing node 200 may comprise a processor 202, a memory controller 204, and a memory 206. A portion of the memory 206 may be a shared memory region 208. The shared memory region 208 may be defined in terms of a range of virtual memory addresses, or in terms of a range of physical memory addresses. Writes targeting addresses within the defined range may be bifurcated by memory controller 204, so that the local shared memory region 208 is updated and, in addition, signals 216 are sent over the link 218 to the logic device. Writes not falling within the reserved region may be handled normally.

For example, as depicted in FIG. 2, the processor 202 may interface with the memory controller 204 to issue a number of memory writes 210. The writes may be directed to various memory addresses. The memory controller 204 may cause the writes to be applied to various portions of the memory 206. As depicted in FIG. 2, a subset of memory writes 212 may be directed to the non-shared portion of memory 206, while another subset of the memory writes 214 may be directed to the shared memory region 208. Those directed to the shared memory region 208 may be bifurcated. The memory controller 204 may detect that the writes are directed to the shared memory region 208, and in response send signals 216 to the logic device. For each write directed to the shared memory region 208, the memory controller 204 may generate a signal that contain information indicating the memory address that was written to and the value written to the memory address.

Figure 3:
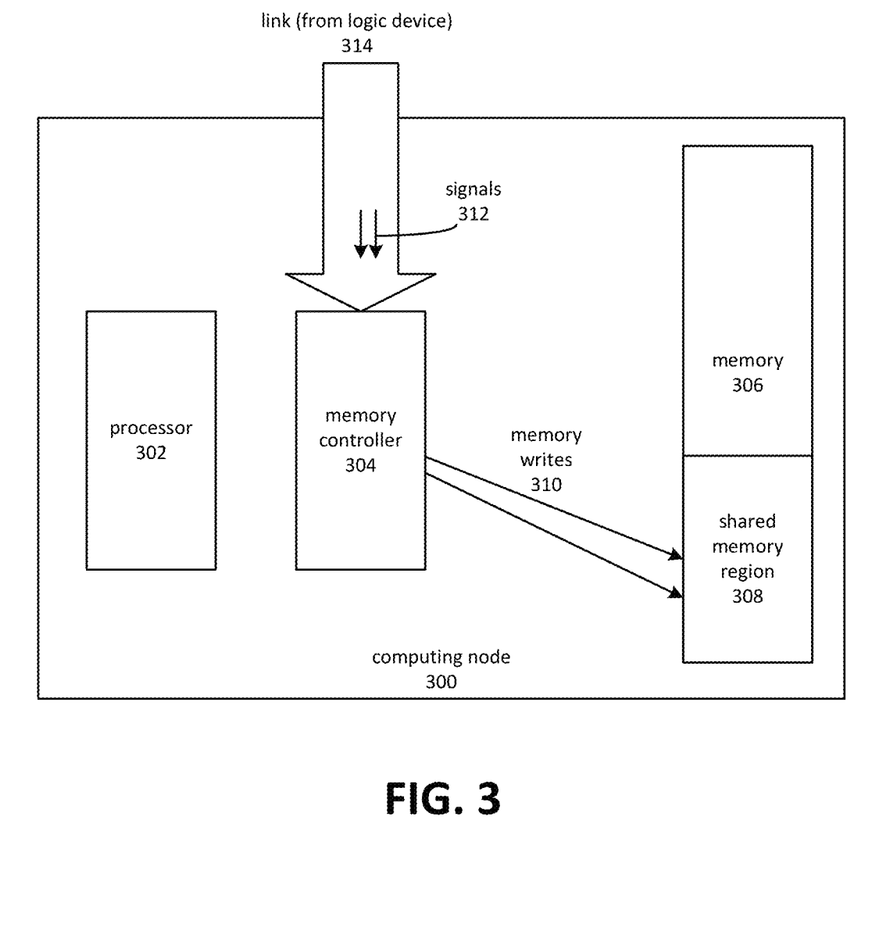
FIG. 3 is a block diagram depicting a computing node with a memory controller configured to synchronize writes to a shared memory region performed by another computing node in a distributed computing system.

The signals sent to the logic device may be forwarded, by the logic device, to other computing nodes in the distributed computing system. FIG. 3 is a block diagram depicting a computing node with a memory controller configured to synchronize writes to a shared memory region performed by another computing node in a distributed computing system. The computing node 300 may receive signals 312 over the link 314 from the logic device. The signals may be processed by the memory controller 304. The memory controller 304 may, for example, cause memory writes 310 to be performed on the shared memory region 308. With reference to FIG. 2, the memory writes 310 may correspond to the subset of memory writes 214 that were directed at the shared memory region 208.

Figure 4:
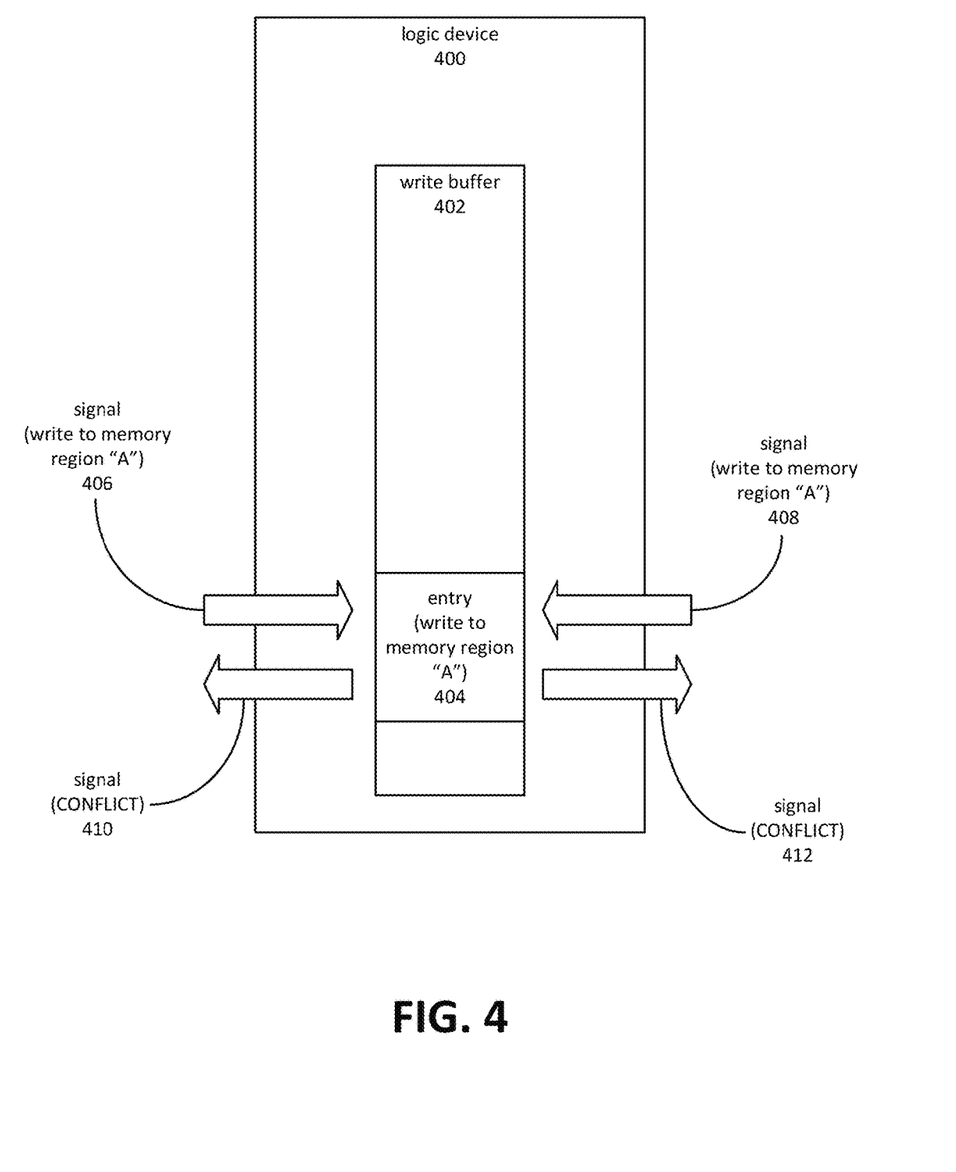
FIG. 4 is a block diagram depicting a logic device that routes memory synchronization signals to computing nodes in a distributed system.

The processor 302 of the computing node 300 may not be involved in processing the memory writes 312. This may allow for increased efficiency of the computing node 200. The logic device may be configured to route the signals between computing nodes of a distributed computing cluster, as well as to perform conflict detection. FIG. 4 is a block diagram depicting an logic device that routes memory synchronization signals to computing nodes in a distributed system. The logic device 400 may comprise a plurality of logic blocks and/or logic gates configured to perform operations consistent with the present disclosure. The logic device may include reconfigurable logic blocks and interconnects. Note, however, that custom-designed devices of a similar nature may be employed. Accordingly, devices similar to logic device 400 that are, nevertheless, not field programmable may be employed. As used herein, the term FPGA may refer to such devices.

The logic device 400 may maintain a data structure that includes information about memory regions that have been written to within some threshold amount of time. The threshold may be based on latency of the links between the logic device 400 and the other computing nodes, and may be adjusted for other latency factors. The data structure is depicted in FIG. 4 as a write buffer 402. However, in various embodiments various types of structures such as lists, maps, arrays, and so forth may be employed to enable the operations of the write buffer 402 that is depicted in FIG. 4.

The write buffer 402 may include information that allows the logic device 400 to detect when a write conflict has occurred. For example, the logic device 400 may receive a signal 406 that is indicative of a write to memory region "A." An entry 404 may be added to the write buffer 402 that is indicative of the write. For example, the entry might describe the source of the write, the address of the write, and the contents of the write. In some cases, a hash of the contents might be used instead of the contents themselves. The entry 404 may be retained in the memory of the logic device 400 for a period of time, such as the aforementioned threshold based on link latency and other factors.

While the entry 404 is retained in the write buffer 402, a second signal 408 might be received from another computing node. The signal 408 might also describe a write operation to the memory region "A." The potential conflict may then be detected and evaluated. The logic device, upon receiving the signal 408, may scan the write buffer 402 to determine if there is an entry that corresponds to or overlaps with memory regions represented in the buffer 402. In the example of FIG. 4, the entry 404 corresponds to memory region "A," as does the signal 408. Accordingly, there is a potential conflict. Note that in some cases the first signal 406 and the second signal 408 might indicate that the same value or values are to be written to the same memory region. This may, depending on the application, be considered acceptable and not handled as a conflict. However, in some instances, such as when the shared memory is being used to represent globally unique incrementing values, it may still be considered a conflict. In the former case, the value to be written may be compared to the value retained in the write buffer 402, in order to determine if the values are conflicting. In some cases, hashes of the values, rather than the values themselves, may be compared.

If a conflict is detected, the logic device may send signals 410 and 412 to computing nodes in the distributed computing to indicate that the writes conflicted. The signals 410, 412 may be associated with a responsive action to be performed by the memory controller. In response to receiving a signal 410, 412 that is indicative of a conflict, the corresponding memory controller may overwrite the memory region that was the target of the request with a data pattern that is indicative of the conflict. For example, if a first computing node wished to write the value 0x10 to the memory location $M_1$, but this conflicted with writing the value "0xA0" to $M_1$ on a second computing node, then the logic device would send a signal to both computing nodes to indicate that the writes conflicted. The memory controllers on each of the two nodes could then write the value 0xFF (or some other pattern) to indicate to the processors of the computing nodes that the write conflicted, at which point conflict resolution could occur. In some cases, rather than both nodes writing the conflict pattern, a first-come, first-served approach might be used, in which the first write to a memory location succeeds and the second write, within a threshold time period, fails.

Figure 5:
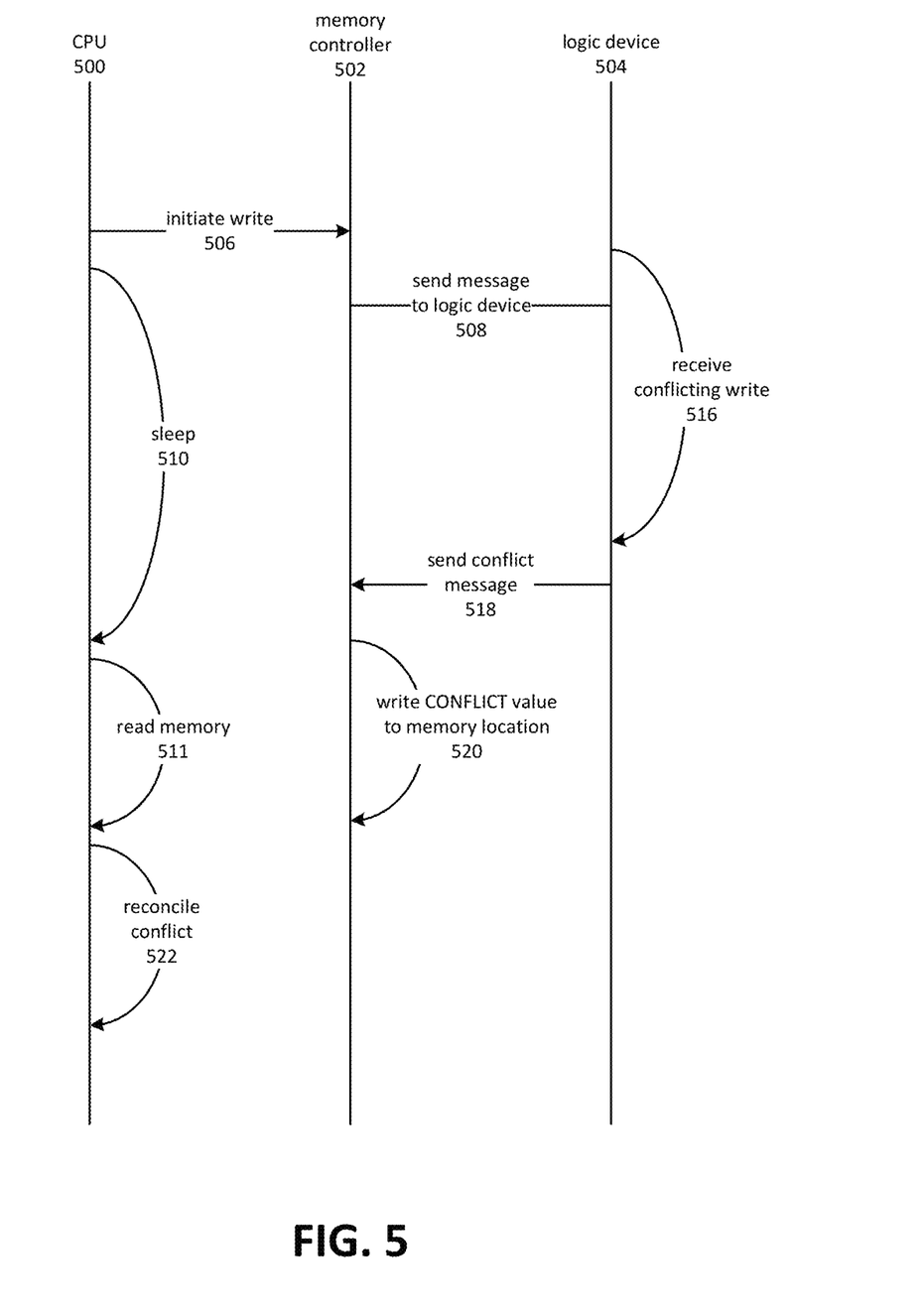
FIG. 5 is an event-trace diagram depicting memory synchronization, conflict detection, and conflict resolution.

The operation of the distributed computing system may be further understood in view of FIG. 5, which is an event-trace diagram depicting memory synchronization, conflict detection, and conflict resolution. FIG. 5 depicts interactions between a CPU 500 and memory controller 502 of a computing node in a distributed computing system. The computing node may be configured to send signals from the memory controller 502 to an external logic device 504.

The CPU 500 may initiate a write to a memory location, as depicted by event 506. The memory location, for the purposes of this example, may be presumed to be directed to a region of memory that is to be synchronized among a plurality of nodes of the distributed computing system.

The memory controller 502 may determine that the write is directed to a region of memory that is to be synchronized. The memory controller may, for example, compare a physical memory address associated with the write operation initiated by the CPU 500 and determine that it falls within a range of physical memory addresses that are to be synchronized among the computing nodes of the distributed system. The memory controller may then, in response, send a message to the logic device 504 that describes the write. This operation is depicted by event 508.

During this period, or perhaps prior to it, the logic device 504 may receive a conflicting write, as depicted by event 516. The logic device 504 may detect the conflicting write by retaining information about write operations for a period of time. The logic device 504 may indicate that a conflict has occurred when more than one write operation is directed to the same memory location within a threshold period of time. The logic device 504 may, in some cases, be configured to applied customized conflict resolution rules, such as treating identical writes to the same portion of memory as a conflict. In some cases, certain regions of memory may be associated with their own sets of conflict detection and resolution rules.

The logic device 504 may respond to the detected conflict by sending a message indicative of the conflict to the computing node, for processing by the memory controller 502. Event 518 depicts sending the message that describes the conflict. In response, the memory controller 502 may write a data pattern indicative of the conflict to the memory location that was the target of the write operation. This is depicted by event 520. The memory controller might, for example, write a value 0xFF in each byte of the targeted memory region, or a repeating pattern such as "0x00FF00FF." These examples are intended to be illustrative, and should not be viewed as limiting.

Returning to the CPU 500, after initiating the write at event 506, it may enter a sleep state during event 510. More precisely, the thread of execution that was executing on the CPU 500 may enter the sleep state. The CPU 500 may, in some instances, be freed to perform other processing during this period. In other cases, the CPU 500 may perform a "spin lock" in which it, in effect, sleeps for a period of time while periodically checking to see if the pseudo-sleep state should be ended.

The CPU 500 may then, as depicted by event 511, read the memory to which the write was directed. If the intended value, rather than the data pattern, is present in the write location then the thread of execution may continue, knowing that the write succeeded and has been synchronized among the other computing nodes in the distributed computing system. However, if the data pattern is there, the thread of execution may proceed to reconcile the conflict. In the example of FIG. 5, at event 511 the memory location is checked and, because a conflict occurred, the data pattern indicative of the conflict has been placed in the memory location by the memory controller 502.

The thread of execution running on CPU 500 may then, as depicted by event 522, attempt to reconcile the conflict. The precise nature of the reconciliation may depend upon the nature of the application.

Figure 6:
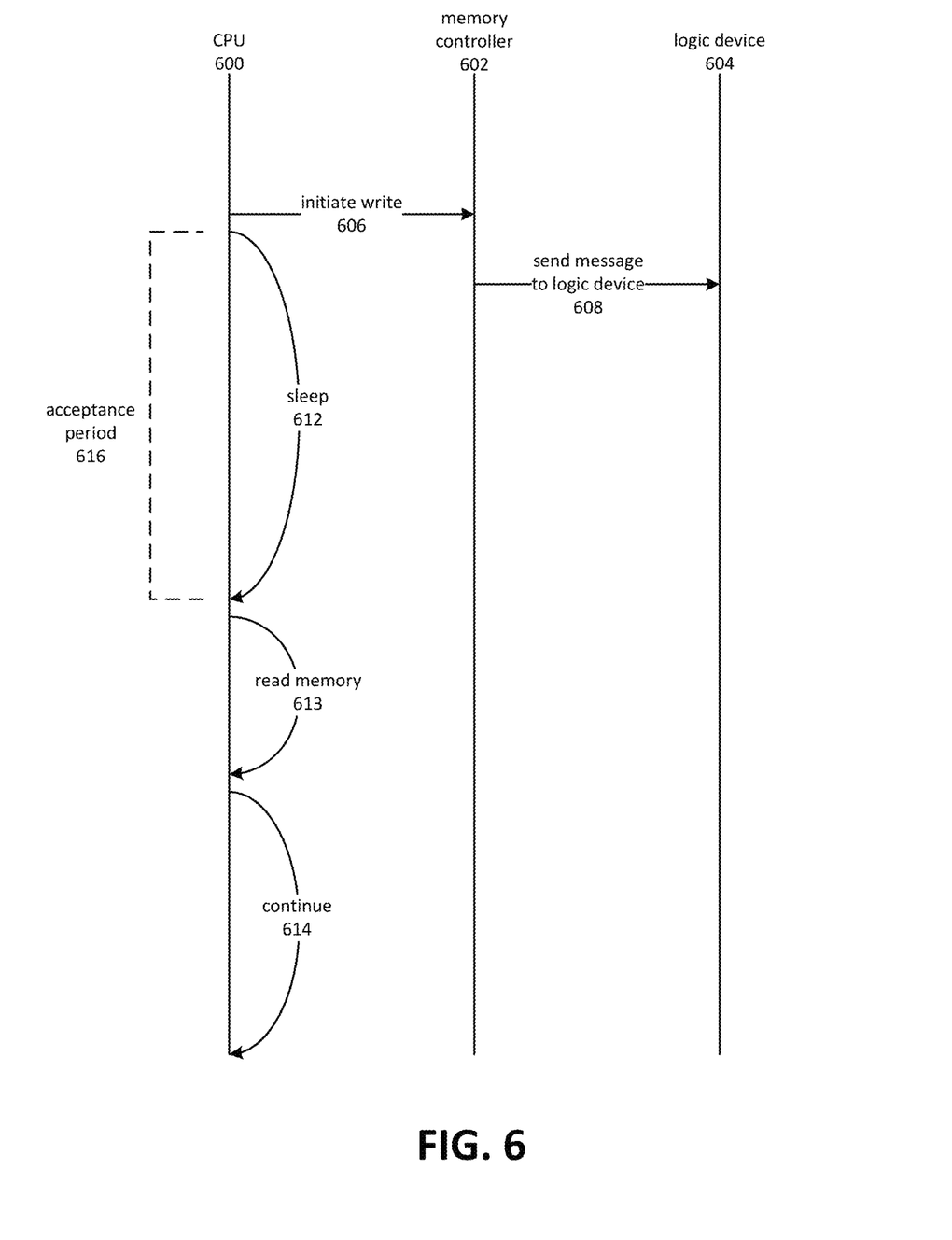
FIG. 6 is an event-trace diagram depicting memory synchronization where no conflict is detected.

FIG. 6 is an event-trace diagram depicting memory synchronization where no conflict is detected. A computing node may consist of a CPU 600 and a memory controller 602. The computing node may be configured to send signals from the memory controller 502 to an external FPGA 504.

A CPU 600 may initiate a write operation, as depicted by event 606. The memory controller 602 may then send a message to the logic device 604, as depicted by event 608. The message may be sent by a link between the computing node and the logic device 604.

The thread of execution running on CPU 600 may then enter a sleep state, as depicted by event 612. After the sleep state, the thread of execution running on CPU 600 may then read the memory location affected by the write operation to determine if the value has been written, or alternatively to determine if the data pattern indicative of a conflict has been written to the memory location. The read memory event 613 may be performed after an acceptance period 616 has elapsed. The acceptance period 616 may correspond to a threshold amount of time based on the latency of the links between the computing nodes and the logic device, and additional latency factors such as processing time. If the data pattern that indicates a conflict has not been written to the memory location within the acceptance period 616, the thread of execution may safely assume that no conflict has occurred and may continue execution, as depicted by event 614. Note that the acceptance period 616 may be considered constant due to various elements of the system described herein, such as the links which operate at no higher than the physical and/or data link layers of the OSI model, the latency characteristics of the employed logic device, and assumptions of complete reliability which may be warranted by the nature of the system's constituent components.

Figure 7:
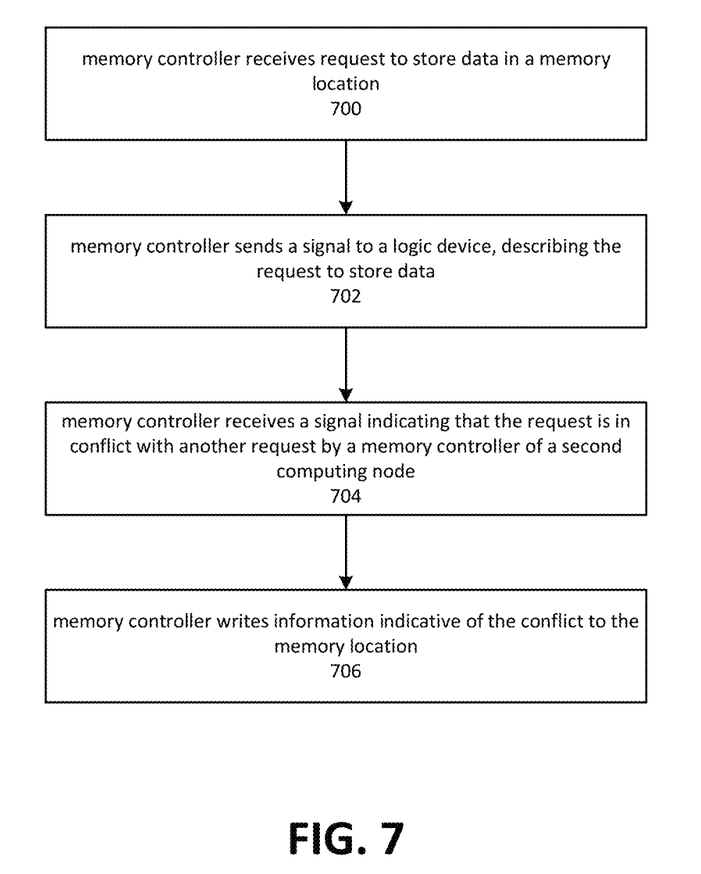
FIG. 7 is a flow diagram depicting the operation of a memory controller synchronizing memory in a distributed computing system.

FIG. 7 is a flow diagram depicting the operation of a memory controller synchronizing memory in a distributed computing system. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel.

As depicted by block 700, a memory controller of a first computing node may receive a request to store data in a memory location. The request may be received from a processor, such as a CPU, that is connected to the memory of the first computing node by way of the memory controller. The request may comprise a range of memory addresses and values that are to be stored in the memory addresses.

At block 702, the memory controller may send a signal to a logic device that is indicative of the request. The signal may contain the range of addresses and the values to be written to those addresses. This may allow the logic device to forward the signals to other computing nodes in the distributed computing system, and to detect conflicts with other write operations.

The memory controller may send the signal to the logic device based at least in part on determining that the first location of the memory is within a region of memory to is to be synchronized with a region of memory on a second computing node.

As depicted by block 704, the memory controller may receive a signal from the FPGA that indicates that the request was in conflict with another write operation being performed by a memory controller of a second computing node. The logic device may have received a signal indicative of the write operation from the second computing node, and detected the conflict with the request made by the memory controller of the first computing node.

As depicted by block 706, the memory controller may, in response to receiving the signal from the logic device, write information to the memory location that indicates that a conflict with another write has occurred. The information may be written to a predefined location within the memory, such as a reserved bit field, to indicate that the conflict occurred. For example, the first byte of every write operation might be reserved for information that indicates whether or not a conflict has occurred. In other cases, the enter region may be overwritten with a data pattern that is indicative of the conflict.

In some instances, the memory controller may send, to the logic device, an additional signal indicative of a request to write an additional data to the first location. The processor of the first computing node may then determine that there is no conflict with the additional request, based at least in part on the first location containing the additional data after a threshold amount of time has elapsed.

The memory controller may also receive requests to store data in a memory location. The requests may be sent by a signal from the logic device. The logic device may send the signal in response to the second computing node writing to a memory location. If no conflict exists, the logic device may instruct the memory controller to write the data to the corresponding location in the memory of the first computing node. If a conflict does exist, the logic device may instruct the memory controller to write information indicative of the conflict to the memory location.

Figure 8:
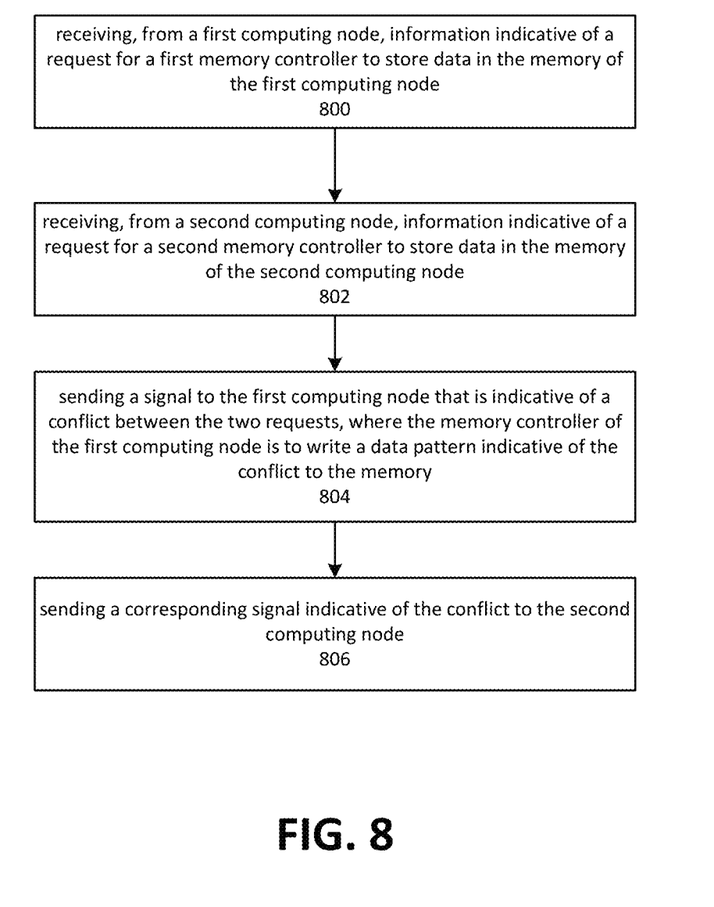
FIG. 8 is a flow diagram depicting the operation of a logic device synchronizing memory in a distributed computing system.

FIG. 8 is a flow diagram depicting the operation of a logic device synchronizing memory in a distributed computing system. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel.

Block 800 depicts the logic device receiving, from a first computing node, a request made to a first memory controller to store data in the memory of a first computing node. The first memory controller may be a component of the first computing node, and may coordinate interaction between a processor and a memory of the first computing node computing node. The processor may have issued a request, to be handled by the first memory controller, to store data within a region of the first computing node's memory. The logic device, as depicted by block 800, may receive a signal from the first computing node that describes the address and values related for the write operation.

Block 802 depicts the logic device receiving, from a second computing node, information describing a write request made to a memory controller of the second computing node.

The logic device may compare the addresses, and in some cases the content, of the write operations and determine that a conflict exists. The memory controller may maintain information which is indicative of the write requests being processed by the memory controllers in the distributed system. The logic device may determine that no conflict exists when, after a threshold amount of time has elapsed, no signal indicative of a write to an overlapping memory region has been received.

In response to detecting the conflict, the logic device may send a signal indicative of the conflict to the first computing node and the second computing node. These operations are depicted by blocks 804 and 806. The memory controllers may then, upon receive of the signals, write information that is indicative of the conflict to the affected memory locations.

Figure 9:
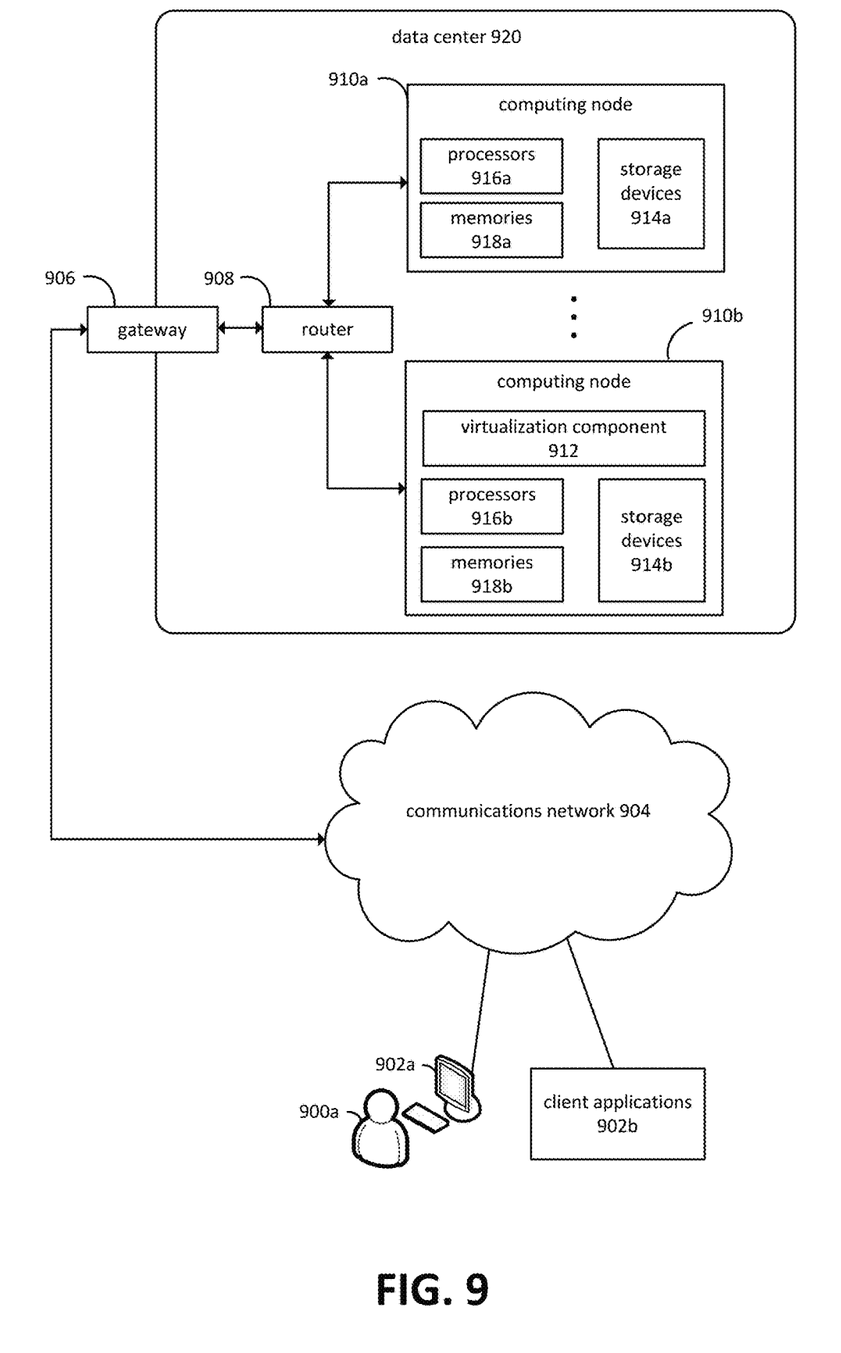
FIG. 9 is a block diagram depicting an embodiment of a computing environment in which aspects of the present disclosure may be practiced.

FIG. 9 is a diagram depicting an example of a distributed computing environment on which aspects of the present invention may be practiced. Various users 900*a* may interact with various client applications, operating on any type of computing device 902*a*, to communicate over communications network 904 with processes executing on various computing nodes 910*a* and 910*b* within a data center 920. Alternatively, client applications 902*b* may communicate without user intervention. Communications network 904 may comprise any combination of communications technology, including the Internet, wired and wireless local area networks, fiber optic networks, satellite communications, and so forth. Any number of networking protocols may be employed.

Communication with processes executing on the computing nodes 910*a* and 910*b* may be provided via gateway 906 and router 908. Numerous other network configurations may also be employed. Although not explicitly depicted in FIG. 9, various authentication mechanisms, web service layers, business objects, or other intermediate layers may be provided to mediate communication with the processes executing on computing nodes 910*a* and 910*b*. Some of these intermediate layers may themselves comprise processes executing on one or more of the computing nodes. Computing nodes 910*a* and 910*b*, and processes executing thereon, may also communicate with each other via router 908. Alternatively, separate communication paths may be employed. In some embodiments, data center 920 may be configured to communicate with additional data centers, such that the computing nodes and processes executing thereon may communicate with computing nodes and processes operating within other data centers.

Computing node 910*a* is depicted as residing on physical hardware comprising one or more processors 916*a*, one or more memories 918*a*, and one or more storage devices 914*a*. Processes on computing node 910*a* may execute in conjunction with an operating system or alternatively may execute as a bare-metal process that directly interacts with physical resources, such as processors 916*a*, memories 918*a*, or storage devices 914*a*.

Computing node 910*b* may comprise a virtualization component 912, which may include a virtual machine host and virtual machine instances to provide shared access to various physical resources, such as physical processors, memory, and storage devices. These resources may include the depicted processors 916*b*, memories 918*b*, and storage devices 914*b*. Any number of virtualization mechanisms might be employed to provide shared access to the physical resources.

The various computing nodes depicted in FIG. 9 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented without the use of virtualization, computing nodes may include one or more memories configured to store computer-readable instructions and one or more processors configured to read and execute the instructions. A computing node may also comprise one or more storage devices, network interfaces, communications buses, user interface devices, and so forth. Computing nodes may also utilize virtualized computing resources, such as virtual machines implemented with or without a hypervisor, virtualized bare-metal environments, and so forth. A virtualization-based computing node therefore encompasses both the virtualization resources and the physical hardware needed to execute the virtualization resources. A computing node may be configured to execute an operating system and application programs. In some embodiments, a computing node might also comprise bare-metal application programs.

Figure 10:
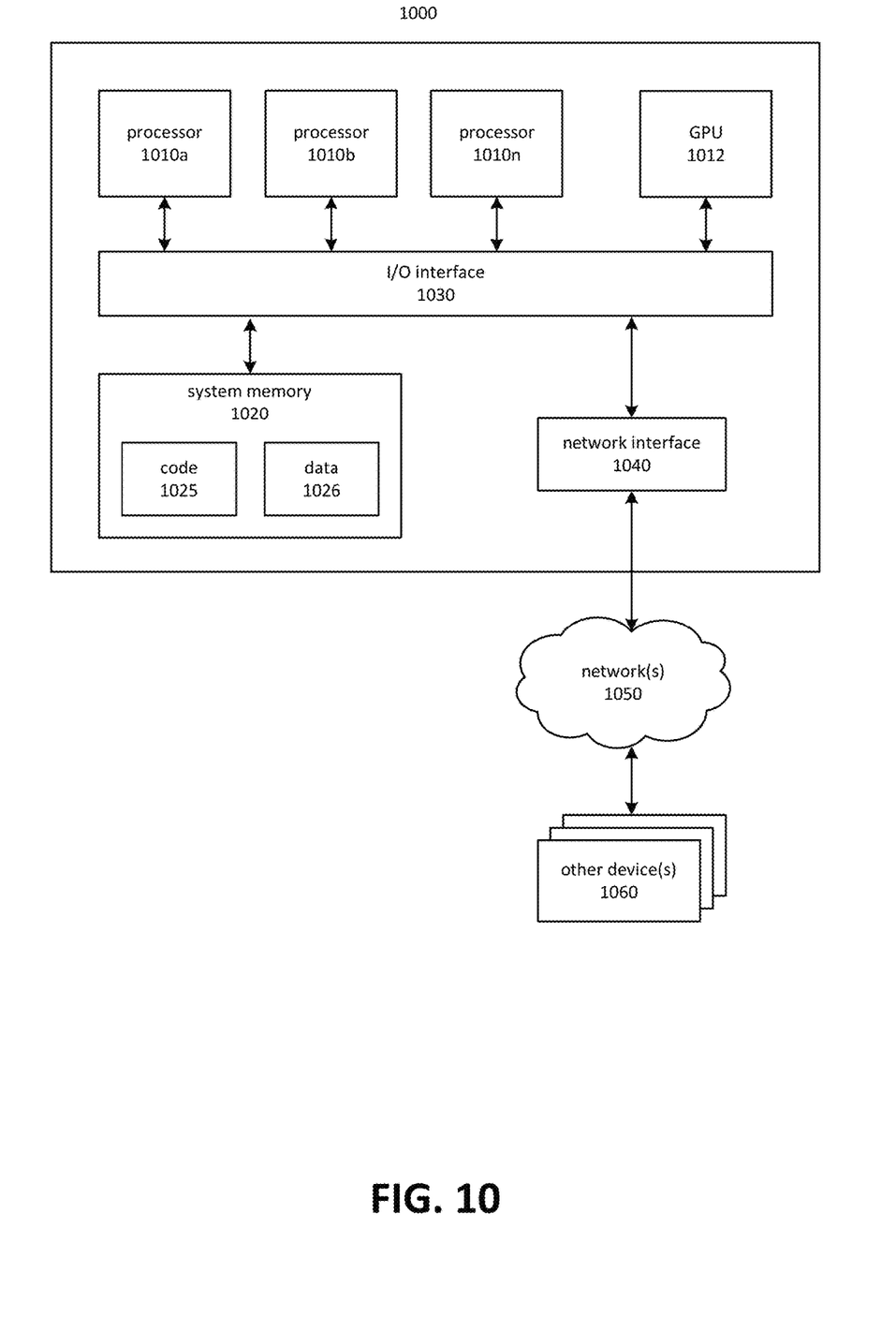
FIG. 10 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 10 depicts a general-purpose computer system that includes or is configured to access one or more computer-accessible media. In the illustrated embodiment, computing device 1000 includes one or more processors 1010a, 1010b, and/or 1010n (which may be referred herein singularly as a processor 1010 or in the plural as the processors 1010) coupled to a system memory 1020 via an input/output ("I/O") interface 1030. Computing device 1000 further includes a network interface 1040 coupled to I/O interface 1030.

In various embodiments, computing device 1000 may be a uniprocessor system including one processor 1010 or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures ("ISAs"), such as the x86, PowerPC, SPARC or MIPS ISAs, or any other suitable ISA. In multiprocessor systems, each of processors 1010 may commonly, but not necessarily, implement the same ISA.

In some embodiments, a graphics processing unit ("GPU") 1012 may participate in providing graphics rendering and/or physics processing capabilities. A GPU may, for example, comprise a highly parallelized processor architecture specialized for graphical computations. In some embodiments, processors 1010 and GPU 1012 may be implemented as one or more of the same type of device. In some instances, the GPU 1012 may perform calculations and execute instructions in cooperation with or in place of the processor 1010. Accordingly, as used herein, the term processor may encompass a GPU. Similarly, other highly parallelized processor architectures that supplement or replace the operation of the primary processor 1010 are also encompassed by the term processor.

System memory 1020 may be configured to store instructions and data accessible by processor(s) 1010. In various embodiments, system memory 1020 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 1020 as code 1025 and data 1026.

In one embodiment, I/O interface 1030 may be configured to coordinate I/O traffic between processor 1010, system memory 1020, and any peripherals in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect ("PCI") bus standard or the Universal Serial Bus ("USB") standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computing device 1000 and other device or devices 1060 attached to a network or networks 1050, such as other computer systems or devices, for example. In various embodiments, network interface 1040 may support communication via any suitable wired or wireless general data networks, such as types of Ethernet networks, for example. Additionally, network interface 1040 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 1020 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 1000 via I/O interface 1030. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 1000 as system memory 1020 or another type of memory. Further, a computer-accessible medium may include transmission media or signals, such as electrical, electromagnetic or digital signals, conveyed via a communication medium, such as a network and/or a wireless link, such as those that may be implemented via network interface 1040. Portions or all of multiple computing devices, such as those illustrated in FIG. 10, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

The computing device 1000 may be configured by software instructions to contain a module (not shown). A module is a component of the computing device 1000 that includes a set of instructions, loaded in whole or in part into system memory 1020, for performing a set of related functions, including input and output with other modules. The code 1025 and data 1026 of system memory 1020 are altered by the loading of the instructions. The operation of a module is effected by interchange between processor 1010, or in a multiprocessor system 1010a-1010n and/or GPU 1012, and the system memory 1020 via I/O interface 1030. A module may interact with other modules of the computing device 1000 via system memory 1020, and with other devices 1060 via network interface 1040 and network 1050.

A compute node, which may be referred to also as a computing node, may be implemented on a wide variety of computing environments, such as tablet computers, personal computers, smartphones, game consoles, commodity-hardware computers, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, instructions executed by one or more computers or computer processors. The instructions may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software instructions and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the instructions, systems, and data structures may also be stored (e.g., as software instructions or structured data) on a computer-readable medium, such as a hard disk, a memory, a network, or a portable media article to be read by an appropriate device or via an appropriate connection. The instructions, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A distributed computing system with multi-node memory synchronization, the system comprising:
    a first computing node and a second computing node, the first computing node communicatively coupled to the second computing node by a logic device, the first computing node comprising a processor connected to a memory by a memory controller, wherein the memory controller at least:
        receives information indicative of a first request to store a first data in a first location of the memory;
        sends, to the logic device, a first signal indicative of writing the first data to the first location;
        receives, from the logic device, a second signal indicative of a conflict between the first request to store the first data in the first location and a second request, by the second computing node, to store a second data to the first location; and
        writes information indicative of the conflict to the first location.

2. The system of claim 1, wherein:
    the memory controller sends, to the logic device, an additional signal indicative of an additional request, by the first computing node, to write an additional data to the first location; and
    the processor determines that there is no conflict with the additional request, based at least in part on accessing information indicative of an absence of conflict in the first location after a threshold amount of time has elapsed.

3. The system of claim 1, wherein the memory controller at least:
    sends the first signal to the logic device based at least in part on determining that the first location of the memory is within a first region of memory to be synchronized with a second region of memory of the second computing node.

4. The system of claim 1, wherein the memory controller at least:
    receives an additional signal indicative of an additional request by the second computing node to write an additional data to an additional location of the memory; and
    writes the additional data to the additional location.

5. The system of claim 1, wherein the processor is configured to access the first location until at least one of determining that a threshold amount of time has elapsed or determining that the first location contains the information indicative of the conflict.

6. A method of synchronizing data between computing nodes of a distributed system, the method comprising:
    receiving, from a first computing node, information indicative of a first request for a first memory controller to store a first data in a first memory location of the first computing node;

receiving, from a second computing node, information indicative of a second request for a second memory controller to store a second data in a second memory location that is synchronized with the first memory location; and sending a signal to the first computing node indicative of a conflict between the first request and second requests, wherein the first memory controller writes information indicative of the conflict to the first memory location in response to the signal.

7. The method of claim 6, further comprising:

receiving information indicative of an additional request, by the first computing node, to write an additional data to the first location; and determining that there is no conflict with the additional request based at least in part on a threshold amount of time elapsing without receiving information indicative of another request that would conflict with the additional request.

8. The method of claim 7, wherein the threshold amount of time is based at least in part on a maximum latency of a link between the first computing node and a logic device.

9. The method of claim 6, wherein the first memory location is within a first region of memory of the first computing node to be synchronized with a second region of memory of the second computing node.

10. The method of claim 6, further comprising:

receiving, from the first computing node, a first additional request to store an additional data in the first memory location; and sending a second additional request to the second computing node to store the additional data in the second memory location.

11. The method of claim 6, further comprising:

receiving the information indicative of the first request by a link operative on at least one of a physical or data link layer.

12. The method of claim 6, wherein a field programmable memory array receives the information indicative of the first request and the information indicative of the second request.

13. The method of claim 6, wherein the first location and the second location correspond to a same physical memory address.

14. A system comprising:

a memory; and a memory controller that at least:

receives information indicative of a first request to store a first data in a first location of the memory;

sends a first signal indicative of writing the first data to the first location;

receives a second signal indicative of a conflict between the first request to store the first data in the first location and a second request, by a second memory controller, to store a second data to the first location; and writes information indicative of the conflict to the first location.

15. The system of claim 14, wherein the memory controller transmits the first signal to a logic device by a link operative on one of a physical layer or data link layer.

16. The system of claim 14, wherein the memory controller at least:

sends the first signal in response to determining that the first location of the memory is within a first region of memory to be synchronized with a second region of memory connected to the second memory controller.

17. The system of claim 14, wherein the memory controller at least:

receives an additional signal indicative of an additional request by the second memory controller to write an additional data to an additional location of the memory; and writes the additional data to the additional location.

18. The system of claim 14, wherein a processor accesses the first location until at least one of determining that a threshold amount of time has elapsed or determining that the first location contains the information indicative of the conflict.

19. The system of claim 14, wherein the information indicative of the conflict comprises data written to a header field of the first location.

20. The system of claim 14, wherein a processor determines that the conflict exists by accessing the first location after a threshold amount of time has elapsed, the threshold amount of time based on latency characteristics of one or more links between the memory controller, a logic device, and the second memory controller.

* * * * *